(12) United States Patent
Bharadwaj Subramanya

(10) Patent No.: US 8,590,025 B2
(45) Date of Patent: Nov. 19, 2013

(54) TECHNIQUES FOR ACCESSING A BACKUP SYSTEM

(75) Inventor: Manjunath Bharadwaj Subramanya, Bangalore (IN)

(73) Assignee: Autonomy, Inc., San Francisco, CA (US)

( * ) Notice: Subject to any disclaimer, the term of this patent is extended or adjusted under 35 U.S.C. 154(b) by 198 days.

(21) Appl. No.: 13/109,064

(22) Filed: May 17, 2011

(65) Prior Publication Data

US 2012/0297468 A1 Nov. 22, 2012

(51) Int. Cl.
*H04L 29/06* (2006.01)

(52) U.S. Cl.
USPC ............ 726/7; 726/4; 726/5; 726/9; 707/609; 707/640; 707/791; 380/201

(58) Field of Classification Search
USPC ............................................................ 726/7
See application file for complete search history.

(56) References Cited

U.S. PATENT DOCUMENTS

| | | | |
|---|---|---|---|
| 6,778,668 B1 * | 8/2004 | Nielsen | 380/201 |
| 2001/0045451 A1 * | 11/2001 | Tan et al. | 235/375 |
| 2007/0136200 A1 * | 6/2007 | Frank et al. | 705/50 |
| 2008/0294462 A1 * | 11/2008 | Nuhaan et al. | 705/3 |
| 2010/0082552 A1 * | 4/2010 | Beatty et al. | 707/674 |
| 2010/0107227 A1 * | 4/2010 | Hicks | 726/5 |

\* cited by examiner

*Primary Examiner* — Taghi Arani
*Assistant Examiner* — Jason Lee

(57) ABSTRACT

A technique accesses a backup system. The technique involves receiving a logon command to logon a user to a website of the backup system. The backup system includes (i) a backup server and (ii) a web server which hosts the website to enable the user to control settings of the backup server. The technique further involves, sending, in response to receiving the logon command, a token request to the backup server through a pre-established secure data pathway to the backup server. Data is periodically backed up to the backup server through the pre-established secure data pathway. The technique further involves acquiring, in response to sending the token request, a logon token from the backup server through the pre-established secure data pathway. When the website receives the logon token during a logon operation, the website communicates with the backup server to determine whether the logon token is authentic.

14 Claims, 5 Drawing Sheets

TECHNIQUES FOR ACCESSING A BACKUP SYSTEM

BACKGROUND

A conventional computerized environment may include computers which periodically backup their information to a backup site. In such an environment, each computer is typically equipped with a backup service which sends information to be backed up to the backup site at periodic intervals (e.g., daily, hourly, etc.).

To equip the computers with the backup services, a backup technician (i.e., a designated IT person) typically installs backup service software on each computer. One conventional backup service software package includes a random number generator routine to provision each computer, during installation/setup time, with a random number which uniquely identifies that computer to the backup site.

After a computer has backed up information to the backup site, if an operator of the computer wishes to restore certain information from the backup site to that computer, the operator requests a username and password from the backup technician. The backup technician then assigns a username and a password to the operator. Using the username and the password assigned to the operator by the backup technician, the operator then logs into the backup site from that computer and directs the backup site to restore that information back on to that computer.

SUMMARY

Unfortunately, there are deficiencies to the above-described conventional computerized environment in which operators, who wish to restore information from the backup site, (i) request usernames and passwords from a backup technician and (ii) use usernames and passwords assigned by the backup technician. For example, even a medium-sized company may have hundreds of computers which are backed up by the backup site thus imposing a significant username and password assignment burden on the backup technician. Additionally, there is often a time urgency associated with information restoration (e.g., an operator's work may come to a stand still until the operator is able to restore lost information), thus making the task of assigning usernames and passwords a relatively high priority.

In contrast to the above-described conventional computerized environment in which operators must request usernames and passwords from a backup technician when restoring information, improved techniques involve acquiring a logon token from a backup server through a pre-established secure data pathway between a client device and the backup server. The logon token can then be used to logon a user to a website having certain control of the backup server (e.g., to restore data from the backup server). Such improved techniques are less burdensome, i.e., they alleviate the need for intervention by a backup technician to assign usernames and passwords. Additionally, such techniques offer minimal latency in obtaining access to the backup server through the website, e.g., time is not wasted searching for a backup technician, explaining the need for a username and password in order to restore information, and waiting for the backup technician to assign a username and password.

One embodiment is directed to a method of accessing a backup system. The method, which is performed in a client device, includes receiving a logon command to logon a user to a website of the backup system. The backup system includes (i) a backup server and (ii) a web server which hosts the website to enable the user to control settings of the backup server. The method further includes, sending, in response to receiving the logon command, a token request to the backup server through a pre-established secure data pathway between the client device and the backup server. Data is periodically backed up from the client device to the backup server through the pre-established secure data pathway in a secure manner. The method further includes acquiring, in response to sending the token request, a logon token from the backup server through the pre-established secure data pathway. The website hosted by the web server is constructed and arranged to communicate with the backup server to determine whether the logon token is authentic when the website receives the logon token during a logon operation.

Other embodiments are directed to a client device, a backup system, a backup server, a web server, a computer program product, and other components of a backup environment. Additionally, other embodiments are directed to processes which are performed by the above-mentioned components of the backup environment.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves acquiring a logon token from a backup server through a pre-established secure data pathway between a client device and the backup server. The logon token can then be used to logon a user to a website having certain control of the backup server (e.g., to restore a lost file from the backup server). Such an improved technique is less burdensome, i.e., the improved technique alleviates the need for intervention by a backup technician to assign a username and a password. Furthermore, such a technique provides minimal latency when obtaining access to the backup server through the website, e.g., time is not wasted searching for a backup technician, explaining the need for a username and password in order to restore information, waiting for the backup technician to assign a username and password, and so on.

Figure 1:
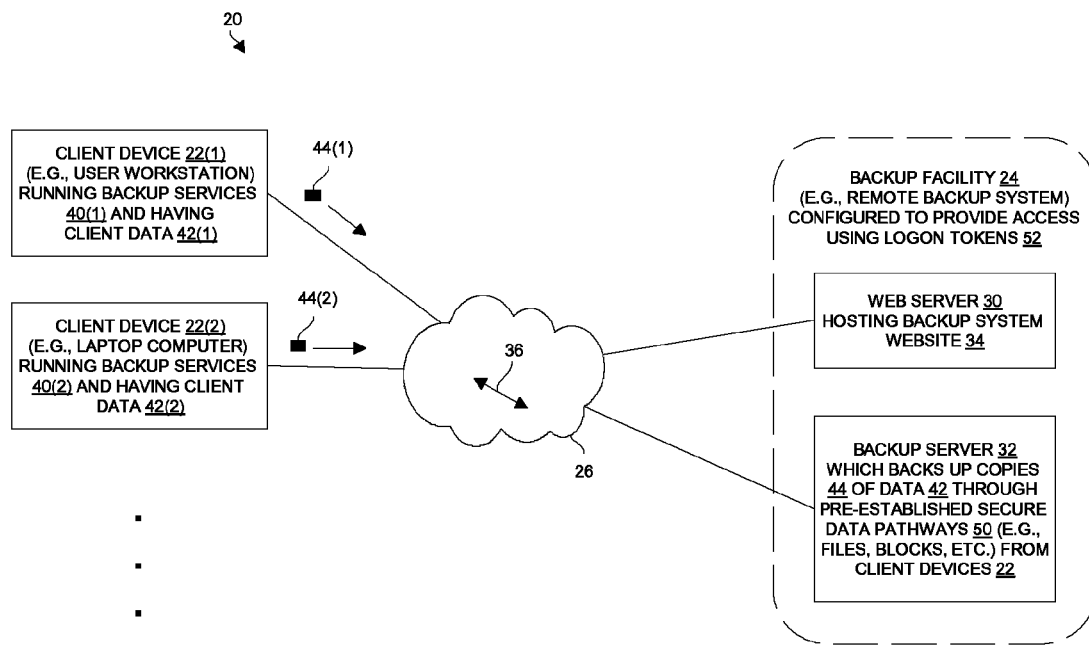
FIG. 1 is a block diagram of an electronic environment which includes a client device and a backup facility.

FIG. 1 shows an electronic environment 20 which enables one or more users to automatically access a backup facility in a secure manner in order to perform certain backup system operations. In particular, with such access, a user is able to perform various backup-related tasks (e.g., restore a file, set or modify certain backup settings, etc.) without participation of a backup technician.

As shown in FIG. 1, the electronic environment 20 includes multiple client devices 22(1), 22(2), . . . (collectively, client devices 22), a backup facility 24, and a communications medium 26. The backup facility 24 (or remote backup system) includes a web server 30 and a backup server 32. The web server 30 hosts a backup system website 34 which is capable of controlling (or changing) certain operational settings of the backup server 32.

The communications medium 26 connects to the client devices 22, the web server 30 and the backup server 32 to enable these components of the environment 20 to exchange electronic communications 36 among each other (e.g., illustrated by the two-sided arrow 36 in FIG. 1). Along these lines, the communications medium 26 is illustrated as a cloud because it is capable of having a variety of topologies including hub-and-spoke, backbone, loop, irregular, a combination of the Internet and LAN(s), combinations thereof, and so on.

During operation, a human backup coordinator (or administrator) configures each client device 22 to perform routine backups with the backup facility 24. In particular, the backup coordinator installs and starts backup software on each client device 22.

Once the backup software is installed and running on a client device 22, the backup software provides a user of the client device 22 with an assortment of backup services 40 including, among other things, a routine backup service to routinely backup client data 42 from the client device 22, and a restoration service to restore the client data 42 to the client device 22. For example, as a user creates and modifies client data 42(1) on the client device 22(1), the client device 22 periodically sends copies 44(1) of the created or modified client data 42(1) to the backup facility 24 to be backed up. Similarly, as a user creates and modifies client data 42(2) on the client device 22(2), the client device 22 periodically sends copies 44(2) of the created or modified client data 42(2) to the backup facility 24 to be backed up, and so on. As a result, the backup facility 24 safely maintains the copies 44 of the client data 42 for possible restoration, while users access the original client data 42 locally on their respective client devices 22.

It should be understood that the client devices 22 can initiate communications with the backup facility 24 through the communications medium 26 without any custom setup by the users of the client devices 22 or by the backup coordinator. Rather, each client device 22 is equipped with the ability to uniquely identify itself to the backup facility 24 (e.g., via random number generation, via network address, combinations thereof, etc.) thus enabling the backup facility 24 to distinguish the client devices 22 from each other without substantially burdening the users of the client devices 22 or the backup coordinator. Such operation enables the backup server 32 to uniquely identify each client device 22 when saving copies 44 of the client data 42.

It should be further understood that some of the electronic communications 36 between the client devices 22 and the backup server 32 occur through pre-established secure data pathways 50. In some arrangements, prior to starting backups on a client device 22, the backup coordinator provisions that client device 22 (as well as the backup server 32) with standard cryptographic protocols (e.g., keys, certificates, etc.) to create a secure data pathway 50 between that client device 22 and the backup server 32 for secure bidirectional communications through the communications medium 26. Accordingly, the client device 22 is then able to periodically transmit copies 44 of the client data 42 (new files/blocks, modified files/blocks, etc.) in a manner which prevents eavesdropping and/or tampering. In some arrangements, the secure data pathways 50 are standard encrypted Secure Sockets Layer (SSL) and/or Transport Layer Security (TLS) connections. Such secure data pathway provisioning can occur as part of the backup software installation process, or separately from the backup software installation process.

Once the secure data pathways 50 are in place (and re-creatable if destroyed), the client devices 22 transfer copies 44 of the client data 42 through the secure data pathways 50 in accordance with backup schedules (e.g., once a day, once an hour, every 15 minutes, customized times, etc.). After the backup facility 24 receives the copies 44 of the client data 42, the backup facility 24 is capable of performing restoration operations without burdening a backup coordinator, administrator or technician.

In particular, the backup facility 24 allows users to access the backed up copies 44 of the client data 42 via the backup system website 34 using logon tokens 52 obtained from the backup server 32 in lieu of usernames and passwords assigned by a backup technician. Along these lines, when the backup services 40 of a client device 22 receives a command from a user to connect to the backup system website 34, the website obtains a logon token 52 from the backup server 32 on behalf of the user. The backup services 40 then activates web browser circuitry and passes the web browser circuitry (i) a URL (Uniform Resource Locator) for the backup system website 34, (ii) an identifier of the client device 22 (e.g., a random string of symbols/characters/numbers which uniquely identifies the client device 22 among other client devices 22), and (iii) the logon token 52. In some arrangements, the identifier of the client device 22 is a random string, 30-40 characters long.

When the website 34 receives the identifier of the client device 22 and the logon token 52, the website 34 communicates with the backup server 32 to authenticate the logon token 52 and thus authenticate the user. If authentication is successful, the website 34 properly logs on the user. However, if authentication is unsuccessful, the website 34 does not logon the user. As a result, users are able to securely retrieve the backed up copies 44 of the client data 42 without intervention by the backup technician.

In some arrangements, the logon token 52 are onetime use tokens. That is, such tokens can be used only once to logon thus preventing the possibility of replay attacks. Furthermore, such tokens become invalid if not used within a certain predefined expiration window of time. In some arrangements, each logon token 52 is a string of symbols (e.g., six characters/numbers for easy viewing and copying via a keyboard, a string of many characters/number to make viewing and copying more difficult, and so on).

Additionally, in some arrangements, the website 34 returns a web-based logon cookie that enables the client device 22 to access the website in a subsequent logon session without any logon token 52 and/or any username/password. Further details will now be provided with reference to FIG. 2.

Figure 2:
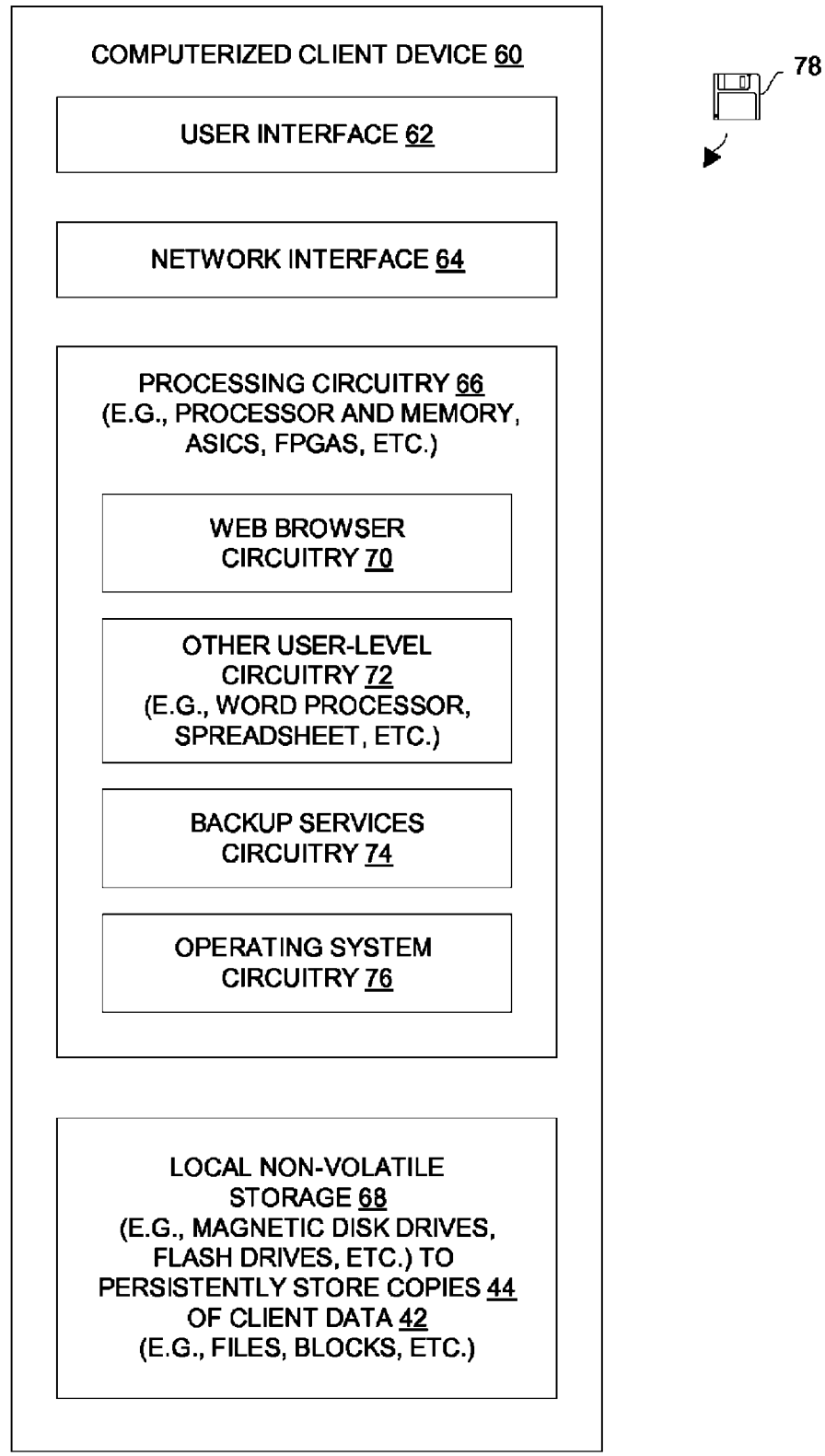
FIG. 2 is a block diagram of the client device of FIG. 1.

FIG. 2 shows particular details of a computerized client device 60 which is suitable for use as any of the client devices 22 in FIG. 1. The computerized client device 60 includes a user interface 62, a network interface 64, processing circuitry 66, and local non-volatile storage 68. The user interface 62 (e.g., a keyboard, mouse and display) is constructed and arranged to receive input from a user, and provide output to the user. The network interface 64 (e.g., a network adapter, a network card, etc.) is constructed and arranged to connect to the communications medium 26 and thus enable the computerized client device 60 to exchange electronic communications 36 with other devices through the communications medium 26 (also see FIG. 1). The processing circuitry 66 (e.g., a set of processors and memory) is constructed and arranged to perform a variety of computerized operations or tasks. The local non-volatile storage 68 (e.g., magnetic disk drives, flash drives, etc.) is constructed and arranged to store data (e.g., files, blocks, records, etc.) in a persistent manner.

As further shown in FIG. 2, the processing circuitry 66 includes web browser circuitry 70, other high level circuitry 72 (e.g., word processor circuitry, spreadsheet circuitry, email circuitry, etc.) for creating and/or modifying client data 42, backup services circuitry (or backup agent) 74, and operating system circuitry 76. Such circuitry can be implemented as a set of processors running in accordance with one or more software constructs (e.g., application suites, programs, toolkits, scripts, drivers, etc.), as specialized hardware circuits (e.g., application specific integrated circuits, field programmable gate arrays, discrete components, etc.), as firmware, combinations thereof, and so on.

Additionally, in the context of a processor running in accordance with particular software constructs, a computer program product 78 is capable of delivering each software construct to the computerized client device 60. The computer program product 78 has a non-transitory (or non-volatile) computer readable storage medium which stores a set of instructions which controls operation of the processing circuitry 66. Examples of suitable computer readable storage media include tangible articles of manufacture and apparatus which store instructions in a non-volatile manner such as CD-ROM, flash memory, disk memory, tape memory, and the like.

During operation of the computerized client device 60, the operating system circuitry 76 effectively and efficiently allocates computerized resources (processor cycles, memory space, etc.) within the computerized client device 60. The backup services circuitry 74, which receives processing time and memory from the operating system circuitry 76, provides a variety of backup and restoration services to the user. Along these lines, the backup services circuitry 74 routinely provides copies 44 of newly created and/or modified client data 42 to the backup facility 24 through a pre-established secure data pathway 50 between the computerized client device 22 and the backup server 32 of the backup facility 24 formed through the communications medium 26 (also see FIG. 1).

Additionally, as will be explained in further detail shortly, the backup services circuitry 74 is able to obtain a logon token 52 from the backup server 32 of the backup facility 24 on behalf of the user. The user is then able to provide the logon token 52 to the website 34 hosted by the web server 30 for authentication purposes. In this manner, the user is able to properly logon to the website 34 and gain control over certain functions of the backup server 32, e.g., change backup settings, restore data, etc. (also see FIG. 1). Such activity is capable of occurring without involvement from a backup technician. Further details will now be provided with reference to FIG. 3.

Figure 3:
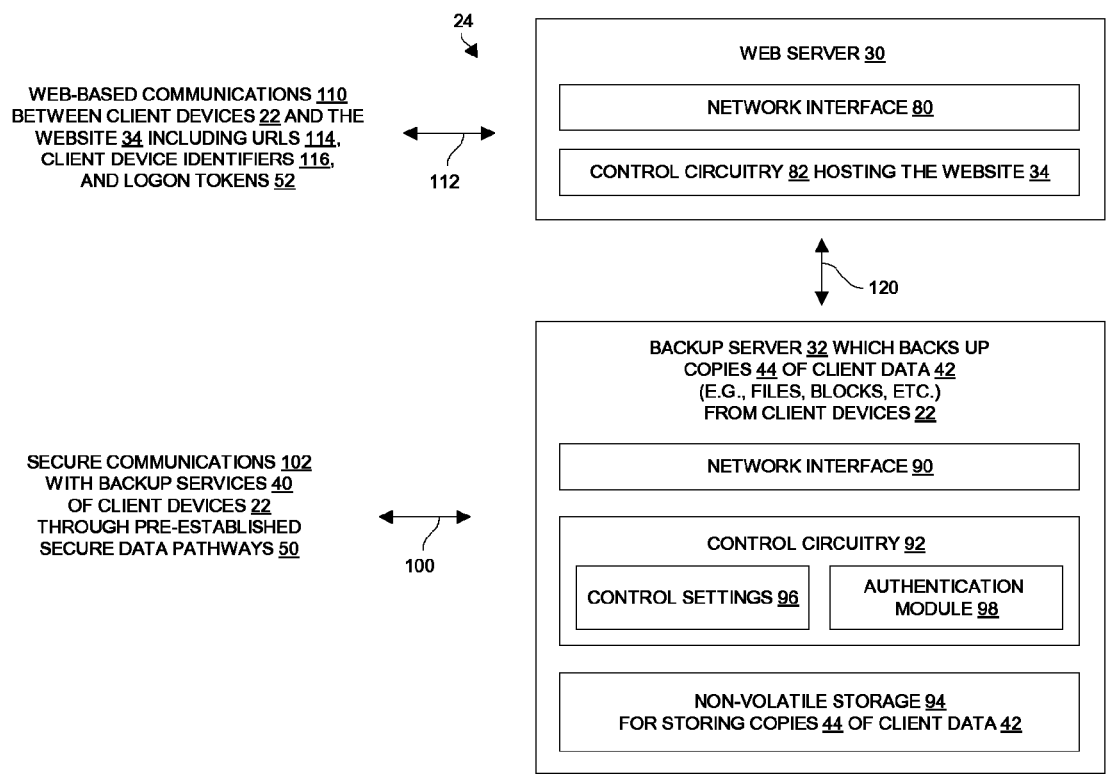
FIG. 3 is a block diagram of the backup facility of FIG. 1.

FIG. 3 shows particular details of the backup facility 24 of the electronic environment 20 (also see FIG. 1). As shown in FIG. 3, the web server 30 includes a network interface 80 and control circuitry 82. The network interface 80 (e.g., a network adapter, a network card, etc.) is constructed and arranged to connect to the communications medium 26 and thus enable the web server 30 to exchange communications with other devices through the communications medium 26. The control circuitry 82 (e.g., a set of processors and memory to run specialized software) is constructed and arranged to host the website 34.

The backup server 32 includes a network interface 90, control circuitry 92, and non-volatile storage 94. The network interface 90 (e.g., a network adapter, a network card, etc.) is constructed and arranged to connect to the communications medium 26 and thus enable the backup server 32 to exchange communications with other devices through the communications medium 26 (also see FIG. 1). The control circuitry 92 (e.g., a set of processors and memory to run specialized software) is constructed and arranged to perform a variety of backup/restore operations or tasks. In particular, the control circuitry 92 is responsible for backing up the copies 44 of the client data 42 from the client devices 22 to the non-volatile storage 94 (e.g., magnetic disk drives, flash drives, etc.) based on particular control settings 96 (e.g., a backup schedule, parameters identifying source locations to back up, and so on). Additionally, the control circuitry 94 is responsible for restoring the copies 44 of the client data 42 from the non-volatile storage 94 to the client devices 22 in response to input from the website 34 of the web server 30.

As further shown in FIG. 3, the control circuitry 92 of the backup server 32 includes an authentication module 98 which is capable of controlling user access. In particular, the authentication module 98 is constructed and arranged to provide logon tokens 52 and subsequently authenticate users attempting to logon to the backup system website 34 based on the provided logon tokens 52. Further details about authentication of users of the website 34 will be provided shortly.

As illustrated by the double arrow 100, the backup server 32 conducts secure communications 102 with the client devices 22 through pre-established secure data pathways 50 (e.g., SSL connections). Recall, that such secure data pathways 50 are set up prior to backing up the copies 44 of the client data 42 from the client devices 22. With the pre-established secure data pathways 50 in place, backups are then performed in a secure manner thus preventing eavesdropping and tampering of the data.

In some arrangements, the respective pre-established secure data pathway 50 between the client device 22 and the backup server 32 is created (or re-created) prior to each backup operation performed by the client device 22, and then destroyed at completion of each backup operation. Such arrangements advantageously minimize ongoing consumption of certain computerized resources (e.g., memory resources of the client device 22).

In other arrangements, the respective pre-established secure data pathway 50 between the client device 22 and the backup server 32 stays intact continuously over multiple backup operations between the client device 22 and the backup server 32. Such arrangements advantageously minimize network traffic associated with creating (and destroying) the pathway 50.

It should be understood that, while the pre-established secure data pathways 50 are in place, the backup services circuitry 74 (FIG. 2) of the client devices 22 are able to logon users of the client devices 22 to the backup system website 34 in response to user commands in an automated manner, i.e., without participation by a backup coordinator. For example, suppose that a user of a client device 22 wishes to obtain access to the backup facility 24 to restore a file. The user enters a logon command into a user input/output (I/O) component of the backup services circuitry 74, and a lower-level component of the backup services circuitry 74 responds to the logon command by requesting and receiving a logon token 52 through a secure data pathway 50 to the backup server 32. Such operation enables secure delivery of the logon token 52 from the backup server 32 to the client device 22 for use in logging on to the backup system website 34.

Once the lower-level component of the backup services circuitry 74 of a client device 22 receives the logon token 52 from the backup server 32, the user I/O component of the backup services circuitry 74 activates the web browser circuitry 70 of the client device 22 to initiate web-based communications 110 between the web browser circuitry 70 and the website 34 of the web server 30 (also see the double arrow 112 in FIG. 3). In particular, the user I/O component of the backup services circuitry 74 provides the URL 114 of the website 34, an identifier 116 of the client device 22 and the logon token 52 to the web browser circuitry 70. In the context of a processor running backup services software, activating the web browser circuitry 70 involves launching a web browser application. In the context of specialized hardware, activating the web browser circuitry 70 involves providing an enable signal to a web browser circuit to enable normal operation of the web browser circuit.

The web browser circuitry 70 then delivers the identifier 116 to the website 34 to uniquely identify the client device 22 to the website 34, and the logon token 52 to authenticate to the website 34. Upon receipt of the identifier 116 and the logon token 52 from the web browser circuitry 70 of the client device 22, the website 34 communicates with the backup server 32 to authenticate the user (see the double arrow 120 in FIG. 3). In particular, if the backup server 32 determines that the logon token 52 matches the logon token 52 that it provided earlier to the backup services circuitry 74 of the particular client device 22, the backup server 32 informs the website 34 that the user has successfully authenticated, and the website 34 properly logs on the user. Once the user has properly logged on, the user is able to perform various operations such as restore a copy 44 of client data 42 from the backup server 32 to the client device 22, change the backup schedule, change what data is backed up, and so on. In some arrangements, the website 34 immediately prompts the user to formally set up a username and a password for subsequent authentication sessions before allowing the user to perform other activities. In other arrangements, the website 34 provides a web-based logon cookie to the client device 22 to enable authentication without further need for a logon token 52 and/or a username/password. Other arrangements and combinations of arrangements are suitable for use as well.

However, if the backup server 32 determines that the logon token 52 does not match the logon token 52 that it provided earlier to the backup services circuitry 74 of the particular client device 22, the backup server 32 informs the website 34 that authentication has failed, and the website 34 then takes remedial action. For example, the website 34 can deny further website access to the user, send a message to the backup coordinator warning of the failed authentication, and so on. Further details of the communications within the electronic system 20 will now be provided with reference to FIG. 4.

Figure 4:
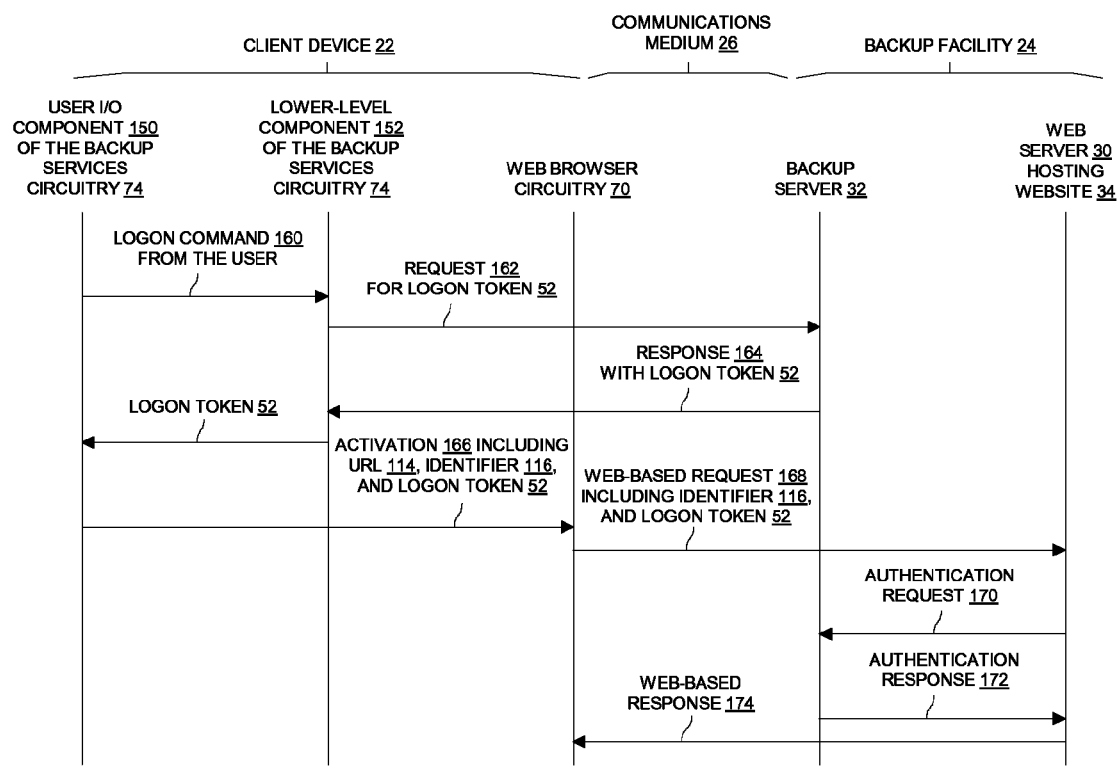
FIG. 4 is a sequence diagram showing various communications which occur between certain components of the backup facility when a user accesses the backup facility.

FIG. 4 is a sequence diagram showing particular participating portions of the electronic environment 20. The backup service circuitry 74 is illustrated as having a user I/O component 150 and a lower-level component 152 since, in some arrangements, the backup service circuitry 74 is implemented in modular form. That is, in some modularized arrangements, the backup service circuitry 74 includes a user I/O module, an underlying communications (or portal) module, a data restoration module, a diagnostic module, and so on. In the context of a processor which runs a set of applications, certain modules may at times be active or inactive. For example, a user I/O module may be inactive on not invoked to save client device 22 resources. However, other modules such as an underlying communications module may stay active continuously to perform background tasks and perhaps to minimize latency when it is quickly called upon for service by another module (e.g., by the user I/O module). Moreover, in some arrangements, the various modules are constructed and arranged to make SOAP (Simple Object Access Protocol) calls when requesting certain services.

As shown in FIG. 4, the user I/O component 150 is constructed and arranged to receive user commands and output information to the user. Additionally, the lower-level component 152 is constructed and arranged to communicate with (i) the user I/O component 150 (e.g., local inter-process communications) and (ii) the backup server 32 through a pre-established secure data pathway 50 (e.g., an SSL connection through which to securely send client data, also see FIG. 3).

Further details will now be provided regarding how the electronic environment 20 provides a particular client device 22 with access to the backup facility 24. Along these lines, when the user wishes to logon to the backup system website 34 from the particular client device 22, the user activates the user I/O component 150 and enters a logon command 160 into the user I/O component 150. In some arrangements, the user I/O component 150 provides a lightweight graphical user interface (GUI) on a display (also see the user interface 62 in FIG. 2), and the user selects a menu option such as "Connect to Backup Server" or "Go To Website".

In response, the user I/O component 150 of the backup services circuitry 74 receives the logon command 160 from the user and passes the logon command 160 to the lower-level component 152 of the backup services circuitry 74. The backup services circuitry 74 then sends a logon token request 162 for a logon token 52 to the backup server 32 through a pre-established secure data pathway 50 between the client device 22 and the backup server 32 (also see FIG. 3). The request 162 may include an identifier 116 to conveniently identify the particular client device 22 among other client devices 22 to the backup server 32. The pre-established secure data pathway 50 may be the same secure connection (e.g., use the same certificates, other access controls, etc.) that the backup services circuitry 74 utilizes when sending copies 44 of client data 42 to the backup server 32 for backing up.

In response to the request 162 for a logon token 52, the backup server 32 provides a response 164 which includes a logon token 52. The backup server 32 is able to maintain a record associating the logon token 52 with the particular client device 22 for authentication purposes. As a result, the backup server 32 is able to assign and manage logon tokens 52 for multiple client devices 22 simultaneously.

Upon receipt of the response 164 containing the logon token 52, the lower-level component 152 of the backup services circuitry 74 passes the logon token 52 up to the user I/O component 150. When the user I/O component 150 receives the logon token 52, the user I/O component 150 provides data 166 which includes the logon token 52 to the web browser circuitry 70. The user I/O component 150 then provides activation 166 to the web browser circuitry 70 (e.g., launches a web browser application) and provides the running web browser circuitry 70 with a URL 114 of the website 34, the identifier 116 which identifies the particular client device 22, and the logon token 52.

The web browser circuitry 70 then sends a web-based request 168 (e.g., an HTTP GET request) to the website 34 hosted by the web server 30 of the backup facility 24. The web-based request 168 includes the logon token 52 and the identifier 116.

When the website 34 receives the web-based request 168 from the web browser circuitry 70 of the client device 22, the website 34 sends an authentication request 170 to the backup server 32 of the backup facility 24. The authentication request 170 includes the logon token 52 and the identifier 116. In some arrangements, a secure data pathway continuously exists between the web server 30 and the backup server 32 through which the servers exchange secure communications.

Next, the backup server 32 responds to the authentication request 170 by comparing the received logon token 52 to the assigned logon token 52 that it provided earlier to the particular client device 22 through the pre-established secure data pathway 50. The backup server 32 then provides an authentication response 172 to the website 34 indicating whether authentication is successful. In particular, if there is a match, the backup server 32 indicates that authentication is successful in the authentication response 172. However, if there is not a match, the backup server 32 indicates that authentication has failed in the authentication response 172.

Upon receipt of the authentication response 172 from the backup server 32, the website 34 provides a web-based response 174 to the web browser circuitry 70 of the particular client device 22. In particular, if authentication is successful, the web-based response 174 includes a web page indicating that the user is successfully logged in and allowing the user to control various operational settings of the backup server 32. In some arrangements, the web-based response 174 prompts the user to create a personal username and password for subsequent logon sessions before allowing the user further access to the backup server 32.

If authentication is unsuccessful, the web-based response 174 is different. For example, the web-based response 174 may deny access to the backup server 32. Alternatively, the web-based response 174 may send an alarm to the backup coordinator. Other types of remedial replies are suitable for use as well. Further details will now be provided with reference to FIG. 5.

Figure 5:
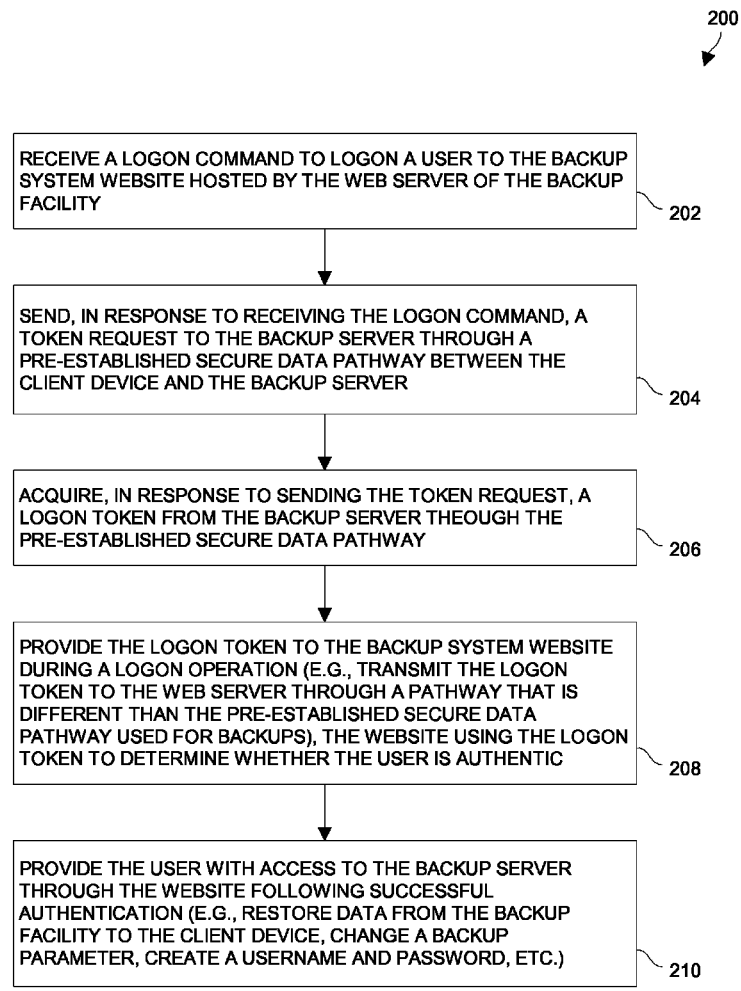
FIG. 5 is a flowchart of a procedure which is performed by a client device of the electronic environment of FIG. 1.

FIG. 5 is a flowchart of a procedure 200 which is performed by a client device 22 during operation of the electronic environment 20 (also see FIGS. 1-4). The procedure 200 is performed to logon a user to the backup system website 34 of the backup facility 24 without burdening a backup coordinator.

In step 202, the client device 22 receives a logon command 160 to logon a user to the website 34 hosted by the web server 30 of the backup facility 24 (FIG. 1). For example, the user may wish to control certain settings of the backup server 32 such as change a backup source location or backup frequency, or to restore client data 42 to the client device 22.

In step 204, the client device 22 sends, in response to receiving the logon command 160, a logon token request 162 (FIG. 4) to the backup server 32 through a pre-established secure data pathway 50 between the client device 22 and the backup server 32. Recall that copies 44 of client data 42 are periodically (e.g., daily, hourly, etc.) backed up from the client device 22 to the backup server 32 through the pre-established secure data pathway 50 in a secure manner.

In step 206, the client device 22 acquires, in response to sending the logon token request 162, a logon token 52 from the backup server 32 through the pre-established secure data pathway 50. With the logon token 52, the client device 22 is able to logon the user to the backup system website 34.

In step 208, the client device 22 provides the logon token 52 to the backup system website 34 during a logon operation. In particular, the client device 22 sends a web-based request 168 to the backup system website 34 (FIG. 4). Recall that the client device 22 transmits the logon token 52 through a pathway which is different than the pre-established secure data pathway 50. The website 34 then communicates with the backup server 32 to determine whether the logon token 52 is authentic.

In step 210, once authentication at the website 34 has successfully completed, the client device 22 provides the user with access to the backup server 32 through the website 34. Accordingly, the user is able to perform various backup system operations without bothering a backup coordinator. For example, the user is able to restore a particular file from the backup server 32 to the client device 22 without intervention by the backup coordinator. Along these lines, the user providing a restore command to the website 34, and the restore command directs the website 34 to carry out a restore operation on the backup server 32 through the communications medium 26 (FIG. 1) to restore the particular file from the backup server 32 to the client device 22. Other operations are available as well such as changing a backup parameter, creating a username and password, and so on.

As described above, improved techniques involve acquiring a logon token 52 from a backup server 32 through a pre-established secure data pathway 50 between a client device 22 and the backup server 32. The logon token 52 can then be used to logon a user to a website 34 having certain control of the backup server 32 (e.g., to restore data from the backup server). Such improved techniques are less burdensome, i.e., they alleviate the need for intervention by a backup technician to assign usernames and passwords. Additionally, such techniques offer minimal latency in obtaining access to the backup server 32 through the website 34, e.g., time is not wasted searching for a backup technician, explaining the need for a username and password in order to restore information, waiting for the backup technician to assign a username and password, and so on.

While various embodiments of the invention have been particularly shown and described, it will be understood by those skilled in the art that various changes in form and details may be made therein without departing from the spirit and scope of the invention as defined by the appended claims.

For example, it should be understood that backups and restores were described above as occurring on the same client device 22 by way of example only. In some arrangements, backups and restores are performed on different client devices 22. In particular, a first client device 22 is capable of providing copies 44 of client data 42 to the backup server 32. Then, the user is able to obtain a logon token 52 by requesting the logon token 52 using that first client device 22. Once the user has obtained the logon token 52, the user is capable of logging on to the website 34 by manually activating web browser circuitry 70 on a second client device 22 (e.g., launching a web browser) and entering the value of the logon token 52 (e.g., a string of characters) into the second client device 22 to authenticate the second client device 22 with the backup system website 34. Such a situation may occur if the user needs to migrate data backed up from the first client device 22 to the second client device 22.

Additionally, it should be understood that the web server 30 and the backup server 32 are located in separate devices in some arrangements. Such a situation may occur to separate the resource demands by the servers 30, 32. For example, the web server 30 may then be provisioned with enhanced web serving capabilities (e.g., with low storage but high processing power). Similarly, the backup server 32 may be provisioned with enhanced storage capabilities (e.g., as an array of disks for RAID, with multiple network adapters for load balancing and fault tolerance, etc.).

However, in other arrangements, the web server 30 and the backup server 32 are co-located on the same device. In these arrangements, the communications between the web server 30 and the backup server 32 (see the double arrow 120 in FIG. 3) may be exclusively internal to the device.

What is claimed is:

1. In a computerized client device, a method of accessing a backup system, the method comprising:
   receiving a logon command to logon a user to a website of the backup system, the backup system including (i) a backup server and (ii) a web server which hosts the website to enable the user to control settings of the backup server;

in response to receiving the logon command, sending a token request to the backup server through a pre-established secure data pathway between the computerized client device and the backup server, data being periodically backed up from the computerized client device to the backup server through the pre-established secure data pathway in a secure manner; and in response to sending the token request, acquiring a logon token from the backup server through the pre-established secure data pathway between the computerized client device and the backup server, the website hosted by the web server being constructed and arranged to communicate with the backup server to determine whether the logon token is authentic when the website receives the logon token during a logon operation; and after the computerized client device acquires the logon token, providing the logon token to the website during the logon operation to logon the user to the website of the backup system, wherein providing the logon token to the website during the logon operation includes transmitting the logon token from the computerized client device to the web server through a second pathway which is different than the pre-established secure data pathway between the computerized client device and the backup server.

2. The method as in claim 1, wherein transmitting the logon token from the computerized client device to the web server through the second pathway includes:

after particular data has been backed up from the computerized client device to the backup server through the pre-established secure data pathway, sending the logon token to the web server through the second pathway as part of a website logon session.

3. The method as in claim 1, further comprising:

automatically launching a web browser on the computer client device in response to the logon command, the logon token being provided to the website via the automatically launched web browser.

4. The method as in claim 3 wherein acquiring the logon token from the backup server includes obtaining, as the logon token, a onetime use token from the backup server; and wherein providing the logon token to the website during the logon operation includes sending the onetime use token from the web browser to the website to logon the user to the website.

5. The method as in claim 3, further comprising:

in response to the user successfully logging on to the website, receiving a logon cookie from the website through the web browser and storing the logon cookie in the computerized client device for use in a subsequent website logon session, and after the logon cookie is stored in the computerized client device, sending contents of the logon cookie from the computerized client device to the website as part of the subsequent website logon session.

6. The method as in claim 3, further comprising:

in response to the user successfully logging on to the website, prompting the user to create a unique username and password for use in a subsequent website logon session, and after the user has created the unique username and password, conveying the unique username and password from the computerized client device to the website as part of the subsequent website logon session.

7. The method as in claim 1, wherein the backup server is to backup data from multiple computerized client devices; wherein the data which is periodically backed up from the computerized client device to the backup server includes a particular file; and wherein the method further comprises:

after the logon token is provided to the website during the logon operation to logon the user to the website, restoring the particular file from the backup server to the computerized client device.

8. The method as in claim 7 wherein the web server communicates with the backup server through a computer network; and wherein restoring the particular file from the backup server to the computerized client device includes:

providing a restore command to the website hosted by the web server, wherein the restore command is to direct the website to carry out a restore operation on the backup server through the computer network to restore the particular file from the backup server to the computerized client device.

9. A computerized client device, comprising:

a user interface;

a network interface;

a controller coupled to the user interface and the network interface, the controller to:

receive, through the user interface, a logon command to logon a user to a website of a backup system, the backup system including (i) a backup server and (ii) a web server which hosts the website to enable the user to control settings of the backup server, in response to receiving the logon command, send a token request to the backup server through the network interface and a pre-established secure data pathway between the computerized client device and the backup server, data being periodically backed up from the computerized client device to the backup server through the network interface and the pre-established secure data pathway in a secure manner, in response to sending the token request, acquire a logon token from the backup server through the network interface and the pre-established secure data pathway between the computerized client device and the backup server, the website hosted by the web server being constructed and arranged to communicate with the backup server to determine whether the logon token is authentic when the website receives the logon token during a logon operation; and provide the logon token to the website during the logon operation to logon the user to the website of the backup system, wherein the controller, when providing the logon token to the website during the logon operation, is to transmit the logon token from the computerized client device to the web server through a second pathway which is different than the pre-established secure data pathway between the computerized client device and the backup server; and at least one hardware processor to implement the controller.

10. The computerized client device as in claim 9, wherein the controller is further to:

automatically launch a web browser on the computer client device in response to the logon command, the logon token being provided to the website via the automatically launched web browser.

11. The computerized client device as in claim 9, further comprising:

non-volatile storage coupled to the controller;

wherein the backup server is to backup data from multiple computerized client devices;

wherein the data which is periodically backed up from the computerized client device to the backup server includes a particular file; and wherein the controller is further to, after the logon token is provided to the website during the logon operation to logon the user to the website, restore the particular file from the backup server to the non-volatile storage.

12. A non-transitory computer readable storage medium that stores a set of instructions which, when carried out by a computerized client device, cause the computerized client device to:

receive a logon command to logon a user to a website of the backup system, the backup system including (i) a backup server and (ii) a web server which hosts the website to enable the user to control settings of the backup server;

in response to receiving the logon command, send a token request to the backup server through a pre-established secure data pathway between the computerized client device and the backup server, data being periodically backed up from the computerized client device to the backup server through the pre-established secure data pathway in a secure manner;

in response to sending the token request, acquire a logon token from the backup server through the pre-established secure data pathway between the computerized client device and the backup server, the website hosted by the web server being constructed and arranged to communicate with the backup server to determine whether the logon token is authentic when the website receives the logon token during a logon operation; and provide the logon token to the website during the logon operation to logon the user to the website of the backup system, wherein the set of instructions further cause the computerized client device, when providing the logon token to the website during the logon operation, to transmit the logon token from the computerized client device to the web server through a second pathway which is different than the pre-established secure data pathway between the computerized client device and the backup server.

13. The non-transitory computer readable storage medium as in claim 12, wherein the set of instructions further cause the computerized client device to:

automatically launch a web browser on the computer client device in response to the logon command, the logon token being provided to the website via the automatically launched web browser.

14. The non-transitory computer readable storage medium as in claim 12, wherein the backup server is to backup data from multiple computerized client devices;

wherein the data which is periodically backed up from the computerized client device to the backup server includes a particular file; and wherein the set of instructions further cause the computerized client device to, after the logon token is provided to the website during the logon operation to logon the user to the website, restore the particular file from the backup server to the computerized client device.

* * * * *